Figure 1:
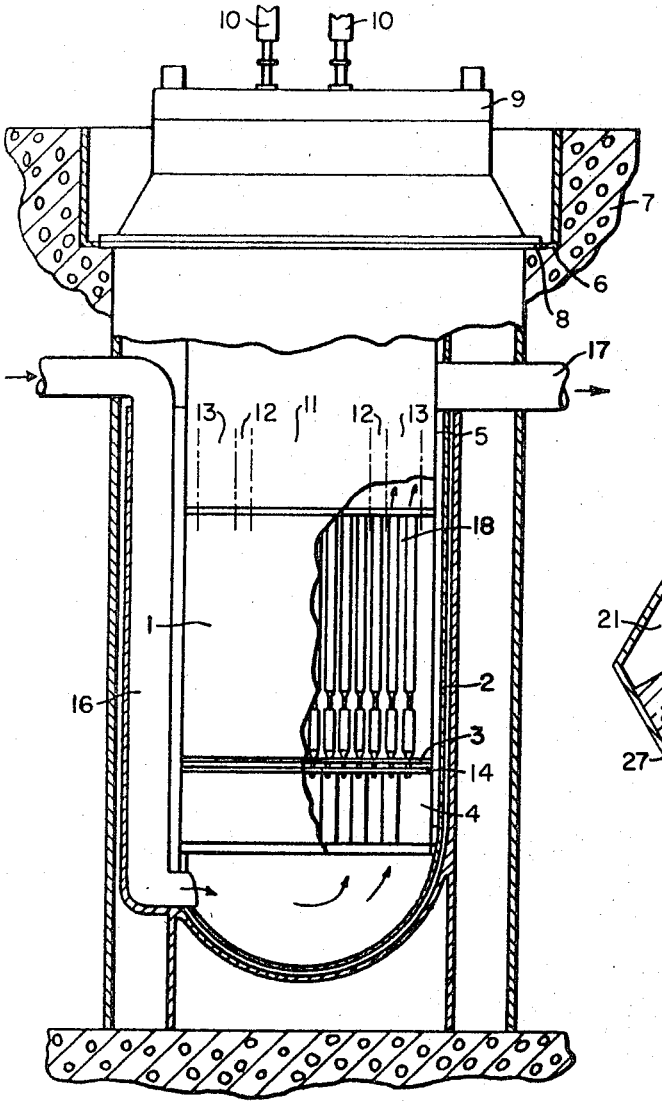
Figure 3:
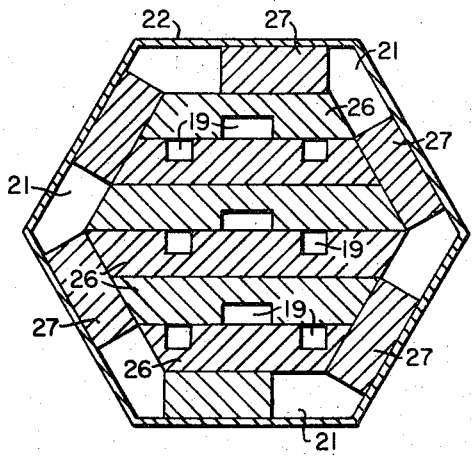
Figure 2:
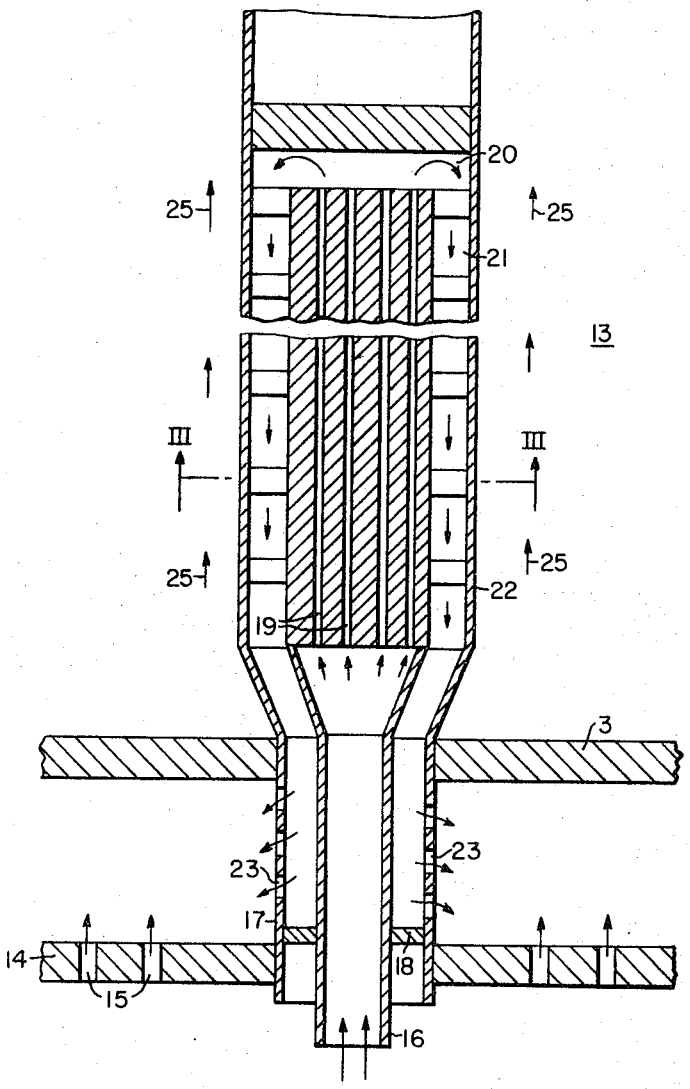

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 1, 1974

927 O.G. 7

T927,001
NUCLEAR CORE AND A REFLECTOR ASSEMBLY THEREFOR

Ajay Bhattacharyya, Vasteros, Sweden, and Ernst H. G. Weiss, Murrysville, Pa., assignors to Westinghouse Electric Corporation, Pittsburgh, Pa.

Filed Mar. 30, 1973, Ser. No. 346,548
**Int. Cl. G21c *15/10***
U.S. Cl. 176—61
2 Sheets Drawing. 17 Pages Specification

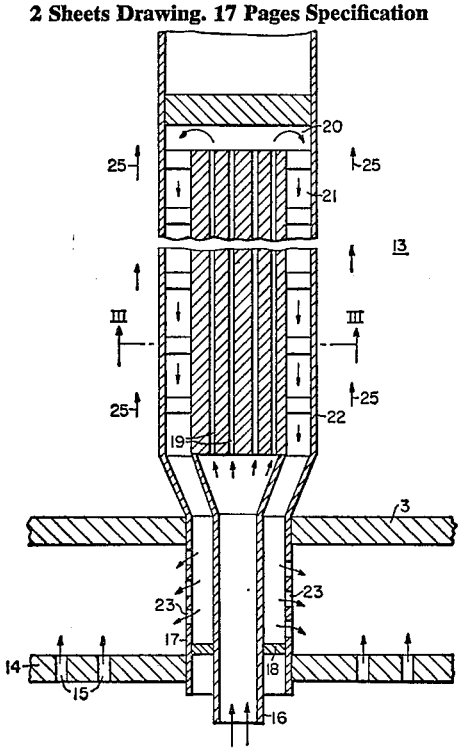

A nuclear core including a reflector assembly cooling arrangement utilizing a combination of forced and natural convection cooling. Forced convection cooling is achieved by using a low pressure gradient to drive coolant through the reflector assembly. Natural convection cooling of the reflector assembly is accomplished by using heat from the reflector assembly and cooling provided by core bypass coolant flow to circulate coolant by natural means through the reflector assembly.

NUCLEAR CORE AND A REFLECTOR ASSEMBLY THEREFOR

Filed March 30, 1973 2 Sheets-Sheet 1

NUCLEAR CORE AND A REFLECTOR ASSEMBLY THEREFOR

Filed March 30, 1973 2 Sheets-Sheet 2